H. P. BARNDT.
CHERRY PITTER.
APPLICATION FILED OCT. 3, 1921.
1,432,012.
Patented Oct. 17, 1922.
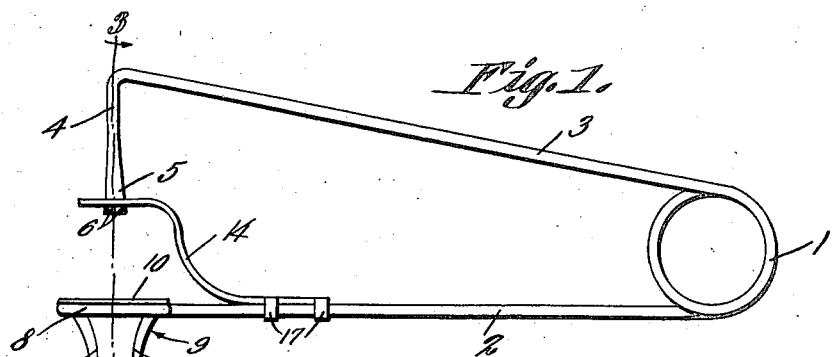
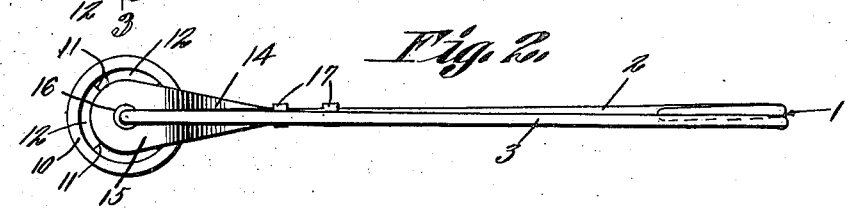
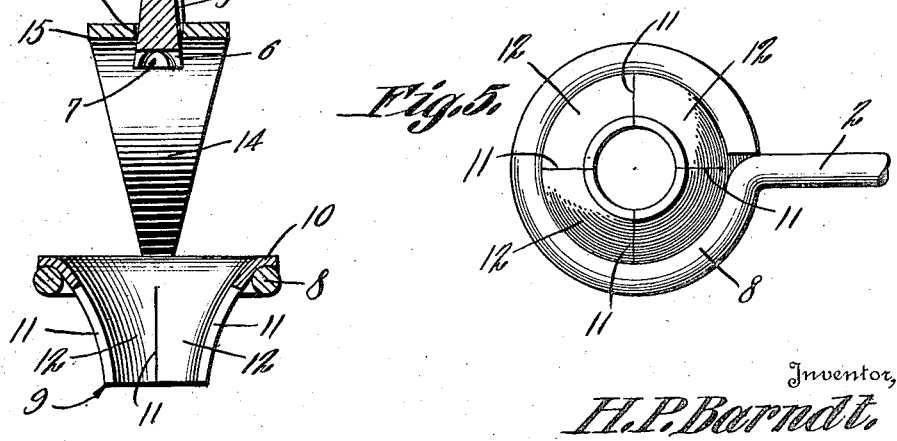
Inventor,
H. P. Barndt,
By
Attorneys Patented Oct. 17, 1922.

1,432,012

UNITED STATES PATENT OFFICE.

HARVEY P. BARNDT, OF DENVER, COLORADO.

CHERRY PITTER.

Application filed October 3, 1921. Serial No. 504,992.

*To all whom it may concern:*

Be it known that I, HARVEY P. BARNDT, a citizen of the United States, residing at Denver, in the county of Denver and State of Colorado, have invented a new and useful Cherry Pitter, of which the following is a specification.

This invention aims to provide a simple means whereby the pits may be removed from cherries and like fruit novel means being provided for handling the fruit after the pit has been removed therefrom.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a top plan; Figure 3 is a section on the line 3—3 of Figure 1; Figure 4 is a plan showing one end of the plunger; Figure 5 is a plan showing a fruit holder and a portion of one arm of the body of the device.

The device forming the subject matter of this application includes a body which may be fashioned from resilient wire or any other suitable material. If the body is formed from wire, the same includes a coiled spring 1 from which arms 2 and 3 extend, although, if desired, the spring shown at 1 may be omitted, the arms 2 and 3 in any event, being resilient. The arm 3 is provided at its free end with a pit-expelling and fruit-carrying plunger, 4 disposed at an acute angle to the arm, the plunger 4 being enlarged adjacent to its operating end, as shown at 5, and terminating in fingers 6 defining a concaved seat 7. The arm 2 terminates in an eye 8 wherein is held an inverted conical fruit holder 9 having a flange 10 which may be secured to the eye 8, the fruit holder being split longitudinally as shown at 11 to form tongues 12, facilitating the shaping of the fruit holder.

The numeral 14 denotes a stripper, made of a reversely curved piece of material, which is broadened at one end as shown at 15, the end 15 being provided with an opening 16, receiving the plunger 4 slidably, but small enough, ordinarily, so that the broadened end 5 of the plunger cannot pass entirely therethrough, when the arms 2 and 3 move apart. One end of the stripper 14 is supplied with lateral wings 17 engaged around and secured to the arm 2.

In practical operation, presupposing that a cherry is to be stoned, the cherry is placed in the fruit holder 9. The arms 2 and 3 are pressed toward each other, the plunger 4 moving downwardly, the cavity at 7 seating the plunger on the pit of the cherry. If the arms 2 and 3 are pressed together still further, the pit is forced out of the fruit, by the action of the plunger 4. The pit passes downwardly through the fruit holder 9, and the fruit remains impaled on the lower end of the plunger 4. When the arms 2 and 3 are released, they move apart, the plunger 4 assuming the position shown in Figure 1, and the stripper 14 removing from the end of the plunger 4, the fruit which was impaled thereon, the fruit dropping into a dish or other receptacle provided for the purpose.

What is claimed is:—

1. In a device of the class described, a body comprising resilient arms, one of which is provided with a closed eye, the other of which is provided with a plunger which is enlarged and tapered, the plunger terminating in fingers defining a seat; a conical fruit holder mounted in the eye and split longitudinally from its extreme end; and a reversely curved stripper having a lateral wing engaging the first specified arm in spaced relation to the eye, the stripper having an opening through which the plunger passes, the tapered plunger engaging the stripper in spaced relation to the fingers, to limit the separation of the arms.

2. In a device of the class described, a body comprising resilient arms, one of which is provided with an eye, the other of which is provided with a plunger which is enlarged and tapered, the plunger terminating in fingers defining a seat; a fruit holder mounted in the eye; and a stripper secured to the first specified arm, the stripper having an opening through which the tapered plunger passes, the tapered plunger engaging the stripper in spaced relation to the fingers, to limit the separation of the arms.

In testimony that I claim the foregoing as my own, I have hereto affixed my signature in the presence of two witnesses.

HARVEY P. BARNDT.

Witnesses:
C. B. WHISLER,
CHARLES L. NORTON.